United States Patent
Chor et al.

[11] Patent Number: 5,844,170
[45] Date of Patent: Dec. 1, 1998

[54] CLOSURE WITH FLOWABLE MATERIAL AND REINFORCING CORE

[75] Inventors: Lawrence C. Chor; Brian K. Molitor, both of Austin, Tex.

[73] Assignee: Minnesota Mining and Manufacturing Company, St. Paul, Minn.

[21] Appl. No.: 609,361

[22] Filed: Mar. 1, 1996

[51] Int. Cl.⁶ .................................................. H02G 15/18
[52] U.S. Cl. ........................................ 174/74 A; 174/93
[58] Field of Search ................................. 174/74 A, 73.1, 174/74 R, 75 R, 93, DIG. 8, 84 R

[56] References Cited

U.S. PATENT DOCUMENTS

| | | | |
|---|---|---|---|
| 3,515,798 | 6/1970 | Sievert | 174/135 |
| 4,079,189 | 3/1978 | Troccoli | 174/73.1 |
| 4,363,842 | 12/1982 | Nelson | 428/36 X |
| 4,378,463 | 3/1983 | Senior et al. | 174/73.1 |
| 4,871,599 | 10/1989 | Knorr | 174/84 R X |
| 5,171,940 | 12/1992 | Vallauri | 174/73.1 |
| 5,365,020 | 11/1994 | Vallauri et al. | 174/73.1 |

FOREIGN PATENT DOCUMENTS

| | | |
|---|---|---|
| 035271 | 9/1981 | European Pat. Off. . |
| 0 424090 | 4/1991 | European Pat. Off. . |
| 435569 | 7/1991 | European Pat. Off. . |
| 0 547656 | 6/1993 | European Pat. Off. . |
| 631357A1 | 12/1994 | European Pat. Off. . |
| 2 518 837 | 12/1981 | France . |
| 39 43 296A1 | 12/1989 | Germany . |
| 44 17 363 A1 | 5/1994 | Germany . |
| PCT/US91/02523 | 4/1991 | WIPO . |
| PCT/US95/06125 | 11/1995 | WIPO . |

*Primary Examiner*—Bot Ledynh
*Assistant Examiner*—Chau N. Nguyen
*Attorney, Agent, or Firm*—Matthew B. McNutt

[57] ABSTRACT

A cable closure assembly using a cold shrink, or prestretched, tube has a flowable material in the assembly, and an extra support core which reinforces the conventional support core that maintains the tube in a radially expanded state. The flowable material may be used to fill voids, or provide improved bonding or water resistance. The extra, or secondary, support core has an outer diameter which is approximately equal to the inner diameter of the primary support core. The secondary support core is sufficiently long to substantially support the area where the flowable material abuts the primary support core. In one embodiment particularly suited for power applications, the elastomeric tube is electrically insulative and the flowable material provides electrical stress control, and another elastomeric tube is provided having a high permittivity. The primary support core may have a varying diameter such that the tubular member has different zones with different expanded diameters. The secondary support core is preferably removed just prior to product application (leaving the larger core intact) so as to increase the product's shelf life.

10 Claims, 1 Drawing Sheet

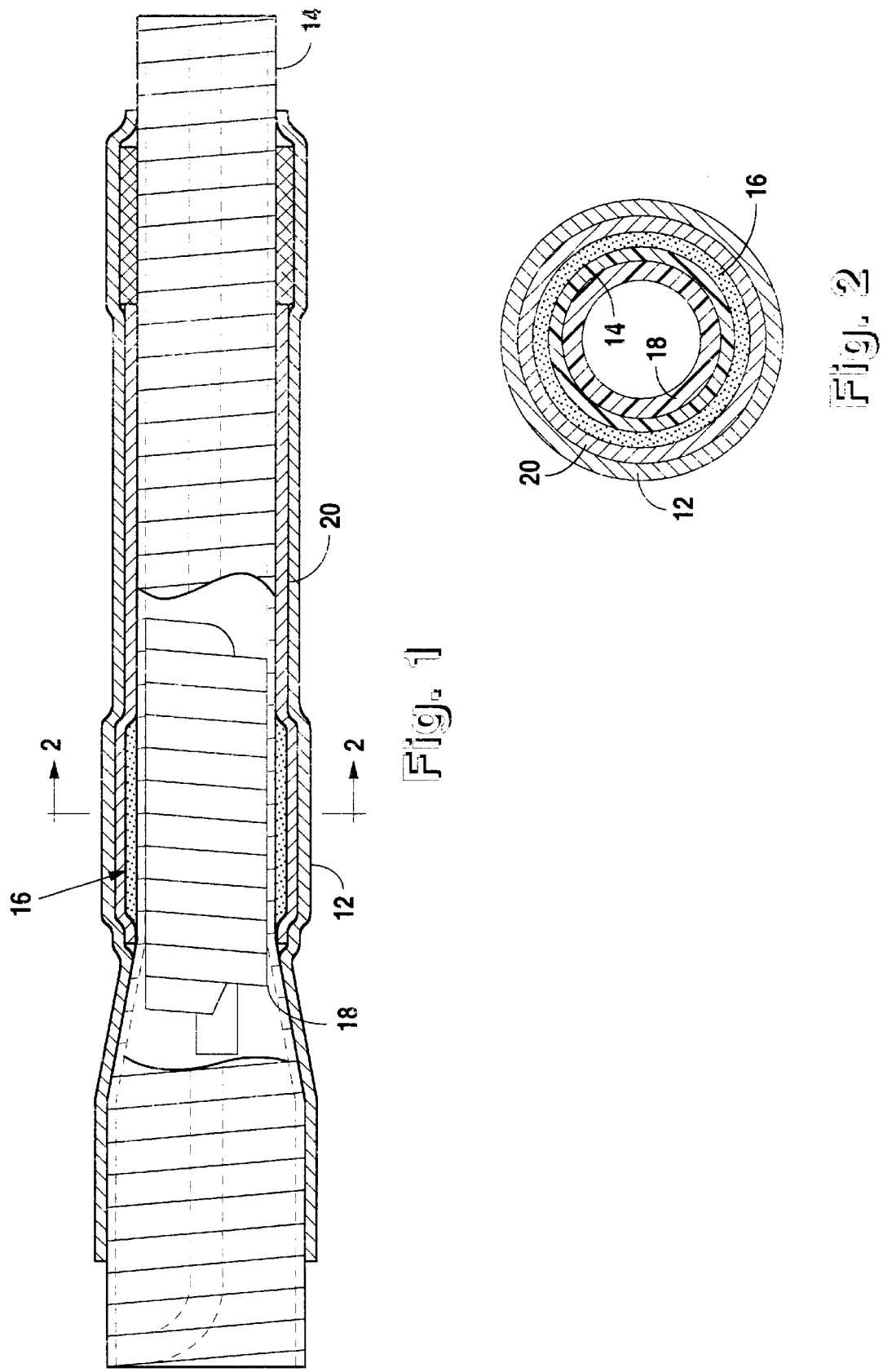

CLOSURE WITH FLOWABLE MATERIAL AND REINFORCING CORE

BACKGROUND OF THE INVENTION

1. Field of the Invention

The present invention generally relates to coverings for connections in cables, and more particularly to an improved closure assembly having a pre-stretched elastomeric tube which contains a flowable material to fill the connection or splice.

2. Description of the Prior Art

Closure assemblies are known in the art and commonly include thermoplastic (heat shrink) tubes, and elastomeric (cold shrink) tubes. Both of these technologies are used to form coverings for splices, terminations and repairs of various cables, including power and telecommunications (copper and optical fiber). One of the earliest cold shrink assemblies is shown in U.S. Pat. No. 3,515,798, which shows a pre-stretched tube (PST) loaded on a removable core. The core is a flat strip which has been formed into a helical support or form, having a diameter which is greater than the diameter of the elastomeric tube in its relaxed state. In this radially expanded state, the PST assembly may be placed about a cable and, as the core is gradually removed, the tube collapses about the cable. Two cores may be used in axial alignment to support a single PST, as depicted in European Patent Application 547,656.

The '798 patent mentions that the inner surface of the elastic tube may carry a thin coating of material to improve the bond or the water resistance between the tube and the cable. European Patent Application No. 424,090 discusses in much greater detail how a conformable material interposed between the PST and its support core may be used to fill the voids and interstices in a cable splice, which not only improves the bond and the water resistance but, for high power applications, also reduces susceptibility to electrical discharge. That disclosure contains a general discussion of other prior art which relates to sealing cable closures. See also European Patent Application No. 631,357.

The use of PST assemblies with an inner layer of conformable material presents a new problem that has not been adequately addressed by the prior art. It is generally preferable to use a support core which is relatively thin, so as to (i) minimize the amount of raw material needed in fabrication of the strip, (ii) minimize waste after installation of the assembly, and (iii) render the assembly more lightweight and versatile. The problem lies with the use of conventional support cores, that is, cores having a thickness which is otherwise suitable for a closure assembly lacking the conformable material. These support cores may sometimes fail due to small imperfections in the circular shape of the outer surface of the core where it contacts the flowable material (or any pliant layer adjacent to the flowable material, such as a plastic film). This failure is due in part to the increased force exerted by the elastomeric tube since its expanded radius is larger because of the thickness of the flowable material, but it is due more to the manner in which the flowable material creeps into any imperfection in the support core's outer surface. In a PST assembly having no flowable material, this effect does not occur since the PST layer is taut and so traverses any imperfection in the support core's outer surface; the lateral support around the imperfection keeps the core from collapsing at that point. In a PST assembly with flowable material, the material enters into the imperfection and transmits the considerable forces of the elastic tube into these areas which lack critical support themselves, allowing the core to collapse only very slightly at first, but irreversibly and continuing to complete failure. While this problem could easily be overcome by simply making the support core thicker, such a requirement is undesirable for the already-mentioned reasons. It would, therefore, be desirable and advantageous to devise a PST assembly with a flowable material which allows the use of a thinner core but reduces such tube collapse so as to increase the shelf life of the product.

SUMMARY OF THE INVENTION

The present invention provides an article for covering a portion of a cable, such as a splice, termination or fault, generally comprising an elastomeric tube, means for supporting the tube in a radially expanded state, a flowable material interposed between the tube and the supporting means, and means for reinforcing the supporting means proximate the flowable material. In one embodiment, the supporting means comprises a hollow, primary support core constructed of a helically wound ribbon; after the reinforcing means has been removed, the primary support core may be removed by pulling on an end of the ribbon, causing the tube to collapse about the cable. The reinforcing means may take the form of a secondary support core having an outer diameter which is approximately equal to the inner diameter of the primary support core. The secondary support core is sufficiently long to substantially support the area where the flowable material abuts, directly or indirectly, the primary support core. The elastomeric tube, primary support core and secondary support core all have a substantially circular cross-section and axes which are generally collinear.

The secondary support core may also be constructed of a helically wound ribbon which is removable from the closure assembly by pulling on one of its ends. The thickness of the primary support core is preferably in the range of 0.06" to 0.1", and the thickness of the secondary support core is preferably in the range of 0.06" to 0.12". The thickness of the primary support core may vary from size to size.

In an embodiment particularly suited for power applications, the elastomeric tube is electrically insulative and the flowable material provides electrical stress control, and another elastomeric tube is provided having a high permittivity. The primary support core may have a varying diameter such that the tubular member has different zones with different expanded diameters.

The secondary support core is preferably removed just prior to product application (leaving the larger core intact) so as to increase the product's shelf life. The closure assembly is thereafter applied to the cable by placing the closure assembly about the cable with the cable passing through the elastomeric tube and the primary support core, and removing the primary support core to allow the elastomeric tube to collapse about the portion of the cable. The secondary support core could nevertheless be removed after placing the closure assembly about the cable. Both of the cores are removed by the helical unwinding action of the ribbon when an end of the ribbon is pulled.

BRIEF DESCRIPTION OF THE DRAWINGS

The invention will best be understood by reference to the accompanying drawings, wherein:

FIG. 1 is a longitudinal cross-section of one embodiment of the closure assembly of the present invention; and FIG. 2 is a transverse cross-section of the closure assembly of FIG. 1, taken along lines 2—2.

DESCRIPTION OF THE PREFERRED EMBODIMENT

With reference now to the figures, and in particular with reference to FIG. 1, there is depicted one embodiment of the closure assembly 10 of the present invention. Closure assembly 10 is generally comprised of an elastic, pre-stretched tube (PST) 12, a primary support core 14, a flowable material 16 interposed between PST 12 and primary support core 14, and a secondary support core 18. Secondary support core 18 has an outer diameter which is approximately equal to the inner diameter of the hollow primary support core 14 (preferably creating an interference fit of 0.001" to 0.05"), and is positioned proximate flowable material 16 so as to reinforce primary support core 14 where it contacts the flowable material. PST 12, primary support core 14 and secondary support core 18 all having a substantially circular cross-section and axes which are generally collinear when assembled into closure assembly 10.

When a conformable compound is placed on primary support core 14, squeezed between it and PST 12, core 14 requires a greater stiffness to maintain the stability of the assembly than it would if it supported the PST only. Primary support core 14 provides adequate support to those areas of PST 12 where there is no inner layer of flowable material. However, as explained above, primary core 14 by itself is too weak to support the areas where there is a layer of flowable material, as this material is pressurized from 60 to 160 p.s.i., and tends to flow towards any weakened area on core 14.

The depicted embodiment shows other features which may advantageously be included a closure assembly for a power cable, such as a second elastic, pre-stretched tube 20 which is immediately adjacent (inside of) PST 12. The present invention provides a secondary support core with the primary core assembly that has sufficient strength to support this three-component electrical stress-control system. The inner component (flowable material 16), which is in intimate contact with primary support core 14, is a conformable, electrical stress controlling material, preferably a synthetic rubber such as silicone. The middle component (PST 20) is a high permittivity elastomeric tube, also preferably constructed of EPDM rubber (ethylene propylene diene methylene). The outer component (PST 14) is an elastomeric insulating tube, preferably constructed of a silicone rubber. Those skilled in the art will appreciate that these details merely constitute one embodiment and are not meant to be construed in a limiting sense.

Closure assembly 10 also depicts a primary support core 14 which has a varying diameter, in this particular example, from 0.75" to 2.7" inner diameter, with essentially three zones, a large diameter zone at one end, a small diameter zone at the other end, and a transition diameter zone between; this is of course only one embodiment and the primary support core could be straight, i.e., constant cross-section. In the embodiment shown, secondary support core 18 is positioned in the smaller diameter zone since that is the location of flowable material 16, but the flowable material and secondary support core could be located elsewhere along the primary support core. Primary support core 14 may optionally also have a varying wall thickness, e.g., from 0.06" to 0.1", to provide increased strength at predetermined locations. Secondary support core 14 preferably has a wall thickness in the range of 0.06" to 0.12".

PST 12 may be constructed of other materials depending upon the application, preferably an elastomer such as natural rubber, styrene-butadiene rubber, polychloroprene, urethane rubber or ethylene propylene rubber (this list is not meant to be exhaustive). PST 12 may have integrally formed portions for stress control, conductivity, etc., as discussed in U.S. patent application Ser. No. 08/384,516, and German Patent Application Nos. P3943296, P4417363 and P4417364.

Support cores 14 and 18 may be formed in many ways, such as by ultrasonically welding the adjacent edges of the helically wound strip or ribbon to form a perforation along the helical seam, or using an interlocking fit as taught in U.S. patent application Ser. No. 08/384,516. They are preferably formed of a durable, flexible polymer such as cellulose acetate, butyrate, polypropylene, polyethylene, polyvinyl-chloride (PVC), polyphenylene oxide (PPO), acrylonitrile butadiene styrene (ABS), polycarbonate, etc. The thickness of secondary support core 18 may also vary, e.g., from 0.06" to 0.12". It is sufficiently long to substantially support the area where flowable material 16 contacts primary support core 14.

Various compositions may be used for the flowable material, including insulative mastics such as polyisobutylene, ethylene propylene rubber, butyl rubber, or other materials such as caulk, silicone grease, cured or uncured elastomers having processing oils or rubber modifiers, liquid elastomers, plasticizers, or modified plastisols (this list is also not exhaustive); see also the material described in U.S. patent application Ser. Nos. 08/524,236 and 08/524,390.

Secondary support core 18 is preferably removed just prior to product application (leaving the larger core intact) so as to increase the product's shelf life. It may be unwound in the same manner as primary support core 14. The use of a secondary support core 18 eliminates the need for a higher strength outer core, allowing primary support core 14 to have thinner wall sections than would otherwise be required. This increases the application range, particularly for the electrical stress control assembly, and decreases the cost of the primary support core. If a thicker core is used, it must have either an increased outer diameter, or a decreased inner diameter. Increasing the outer diameter also increases the expanded diameter of PST 12 which adversely increases the forces acting upon the core. On the other hand, decreasing the inner diameter presents a smaller passageway for the cable and so restricts application range. The present invention avoids both of these undesirable situations. It is also beneficial that secondary support core is removed by the helical unwinding action since alternative supports, such as a semi-rigid paper core or pipe, could become stuck in place by the pressures exerted onto and through primary support core 14. An interference fit may not be desired in some alternative designs. For example, to ensure that secondary support core 18 is removed before removing primary support core 14, the pulled end of the ribbon forming primary support core 14 may be threaded between the two cores, to pinch the ribbon and make it difficult to pull out (without first removing secondary support core 18). In order to allow the ribbon to be located between the two cores, it might be necessary to reduce the diameter of secondary support core 18 to allow room for the ribbon.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that such modifications can be made without departing from the spirit or scope of the present invention as defined in the appended claims.

We claim:

1. An article for covering a portion of a cable, such as a splice, termination or fault, the article comprising:

an elastic, tubular member;

means for supporting said tubular member in a radically expanded state, wherein said supporting means comprises a primary support core having a helically wound ribbon which is removable from said tubular member by pulling on an end of said ribbon such that said tubular member may collapse about the portion of the cable;

a flowable material interposed between said tubular member and said supporting means; and means for reinforcing said supporting means proximate said flowable material, wherein said reinforcing means comprises a secondary support core having a helically wound ribbon which is removable from said tubular member by pulling on an end of said ribbon.

2. The article of claim 1 wherein said ribbon is pinched between said primary support core and said reinforcing means.

3. A cable closure assembly comprising:

a tube constructed of an elastomeric material;

a hollow, primary support core maintaining said elastomeric tube in a radically expanded state, said primary support core being removable such that said elastomeric tube may collapse about a portion of a cable, wherein said primary support core has a wall with a thickness in the range of 0.06" to 0.1";

a flowable material interposed between said elastomeric tube and said primary support core; and a secondary support core having an outer diameter which is approximately equal to an inner diameter of said primary support core, said secondary support core being sufficiently long to substantially support an area where said flowable material abuts said primary support core, and said elastomeric tube, primary support core and secondary support core all having a substantially circular cross-section and axes which are generally collinear, wherein said secondary support core is also hollow and is constructed of a helically wound ribbon which is removable from the cable closure assembly by pulling on an end of said ribbon, said ribbon having a thickness in the range of 0.06" to 0.12".

4. The cable closure assembly of claim 3 wherein said primary support core has an outer surface having a varying diameter such that said elastomeric tube has different zones having different expanded diameters when loaded on said outer surface.

5. The cable closure assembly of claim 3 wherein said elastomeric tube is electrically insulative and said flowable material provides electrical stress control, and further comprising a high permittivity layer disposed between said elastomeric tube and said primary support core.

6. A method of applying a closure assembly to a portion of a cable, the closure assembly having an elastomeric tube, a hollow, primary support core maintaining the elastomeric tube in a radically expanded state, a flowable material interposed between the elastomeric tube and the primary support core, and a hollow, secondary support core proximate the flowable material having an outer diameter which is approximately equal to an inner diameter of the primary support core, the method comprising the steps of:

removing the secondary support core, wherein the secondary support core is constructed of a ribbon formed into a helical shape, and is removed by the helical unwinding action of the ribbon when an end of the ribbon is pulled;

placing the closure assembly about the portion of the cable with the cable passing through the elastomeric tube and the primary support core;

removing the primary support core to allow the elastomeric tube to collapse about the portion of the cable.

7. The method of claim 6 wherein the primary support core is constructed of a second ribbon formed into a helical shape, and is removed by the helical unwinding action of the second ribbon when an end of the second ribbon is pulled.

8. A cable closure assembly comprising:

a tube constructed of an elastomeric material;

a hollow, primary support core maintaining said elastomeric tube in a radically expanded state, said primary support core being removable such that said elastomeric tube may collapse about a portion of a cable, wherein said primary support core has a wall with a thickness in the range of 0.06" and 0.1"; and a secondary support core having an outer diameter which is approximately equal to an inner diameter of said primary support core, said secondary support core being sufficiently long to substantially support an area of weakness in said primary support core, and said elastomeric tube, said primary support core and secondary support core all having a substantially circular cross-section and axes which are generally collinear, wherein said secondary support core is hollow and is constructed of a helically wound ribbon which is removable from the cable closure assembly by pulling on an end of said ribbon, said ribbon having a thickness in the range of 0.06" to 0.12".

9. The cable closure assembly of claim 8 wherein said primary support core has an outer surface having a varying diameter such that said elastomeric tube has different zones having different expanded diameters when loaded on said surface.

10. The cable closure assembly of claim 8 wherein said elastomeric tube is electrically insulative.

* * * * *